(12) United States Patent
Chandaria et al.

(10) Patent No.: US 10,853,108 B2
(45) Date of Patent: Dec. 1, 2020

(54) METHOD AND APPARATUS FOR CODE VIRTUALIZATION AND REMOTE PROCESS CALL GENERATION

(71) Applicant: Ciambella Ltd., Tortola (VG)

(72) Inventors: Trisala Chandaria, New York, NY (US); Jean-Baptiste Leonelli, Levallois (FR)

(73) Assignee: Ciambella Ltd., Tortola (VG)

( * ) Notice: Subject to any disclaimer, the term of this patent is extended or adjusted under 35 U.S.C. 154(b) by 111 days.

(21) Appl. No.: 15/231,103

(22) Filed: Aug. 8, 2016

(65) Prior Publication Data
US 2016/0364254 A1    Dec. 15, 2016

Related U.S. Application Data

(63) Continuation of application No. 14/307,198, filed on Jun. 17, 2014, now Pat. No. 9,436,439.
(Continued)

(51) Int. Cl.
*G06F 9/44* (2018.01)
*G06F 9/45* (2006.01)
(Continued)

(52) U.S. Cl.
CPC ............ *G06F 9/45516* (2013.01); *G06F 8/30* (2013.01); *G06F 8/31* (2013.01); *G06F 8/34* (2013.01);
(Continued)

(58) Field of Classification Search
CPC ........ G06F 9/45516; G06F 8/31; G06F 9/547; G06F 8/30–31; G06F 8/34; G06F 8/61;
(Continued)

(56) References Cited

U.S. PATENT DOCUMENTS 5,887,172 A    3/1999  Vasudevan et al.
6,065,053 A    5/2000  Nouri et al.
(Continued)

FOREIGN PATENT DOCUMENTS

CN          1821964 A      8/2006
CN        201017215 Y      2/2008
(Continued)

OTHER PUBLICATIONS

Raghunathan Srinivasan, Software based remote attestation for OS kernel and user applications, 2011, pp. 1048-1055. https://ieeexplore.ieee.org/stamp/stamp.jsp?tp=&arnumber=6113258 (Year: 2011) (Year: 2011).*
(Continued)

*Primary Examiner* — Mongbao Nguyen
(74) *Attorney, Agent, or Firm* — Moser Taboada

(57) ABSTRACT

A method and apparatus for code virtualization is provided. A computer-implemented method for code virtualization comprises receiving, at a virtual code provider (VCP), a selection of a remote process for execution on the VCP, the remote process correlated to at least one remote service provided by a classical services component (CSC), remote to the VCP, generating, at the VCP, a code snippet with parameters from pre-defined fields to call the remote process, and providing the code snippet for insertion into a local code base on a user device. The code snippet when executed on the user device calls the remote process at the VCP from the user device.

16 Claims, 7 Drawing Sheets

Related U.S. Application Data

(60) Provisional application No. 61/836,628, filed on Jun. 18, 2013, provisional application No. 61/842,906, filed on Jul. 3, 2013.

(51) Int. Cl.
  *G06F 9/445* (2018.01)
  *G06F 9/455* (2018.01)
  *G06F 8/34* (2018.01)
  *H04L 29/08* (2006.01)
  *G06F 9/54* (2006.01)
  *G06F 8/30* (2018.01)
  *H04L 29/06* (2006.01)
  *G06F 8/61* (2018.01)

(52) U.S. Cl.
  CPC .............. *G06F 8/61* (2013.01); *G06F 9/547* (2013.01); *H04L 63/08* (2013.01); *H04L 67/10* (2013.01); *H04L 67/34* (2013.01)

(58) Field of Classification Search
  CPC .... H04L 63/08; H04L 67/34; H04L 67/10–34
  See application file for complete search history.

(56) References Cited

U.S. PATENT DOCUMENTS

| | | | |
|---|---|---|---|
| 6,108,715 A | 8/2000 | Leach et al. | |
| 6,158,031 A | 12/2000 | Mack et al. | |
| 6,895,573 B2 | 5/2005 | Norgaard et al. | |
| 7,086,014 B1 | 8/2006 | Bartz et al. | |
| 7,246,319 B2 | 7/2007 | Alden et al. | |
| 8,055,386 B2 | 11/2011 | McCoy et al. | |
| 8,086,744 B2 | 12/2011 | Abdullah et al. | |
| 8,245,186 B2* | 8/2012 | Gryko | G06F 8/33 715/826 |
| 8,352,903 B1 | 1/2013 | Friedman | |
| 8,533,667 B2* | 9/2013 | Alexander | G06F 9/453 717/109 |
| 8,572,560 B2* | 10/2013 | Drissi | G06F 8/71 717/120 |
| 8,959,477 B2* | 2/2015 | Mueller | G06F 9/44 717/106 |
| 8,990,787 B2 | 3/2015 | Balassanian | |
| 9,063,753 B2* | 6/2015 | Schaude | G06F 9/4498 |
| 9,372,785 B2* | 6/2016 | Wang | G06F 11/3684 |
| 9,571,591 B2* | 2/2017 | Greifeneder | H04L 67/22 |
| 9,678,747 B2* | 6/2017 | Beckett | G06F 8/76 |
| 2002/0188538 A1* | 12/2002 | Robertson | H04L 41/5058 705/35 |
| 2002/0194313 A1 | 12/2002 | Brannock | |
| 2003/0037181 A1 | 2/2003 | Freed | |
| 2003/0061274 A1 | 3/2003 | Lo | |
| 2003/0120707 A1* | 6/2003 | Bogdan | G06F 8/71 718/106 |
| 2003/0177208 A1 | 9/2003 | Harvey, IV | |
| 2003/0204560 A1 | 10/2003 | Chen et al. | |
| 2004/0010734 A1 | 1/2004 | Ghercioiu et al. | |
| 2004/0040028 A1 | 2/2004 | Moreau | |
| 2004/0193635 A1 | 9/2004 | Hsu et al. | |
| 2004/0221238 A1 | 11/2004 | Cifra et al. | |
| 2004/0249944 A1* | 12/2004 | Hosking | G06F 9/50 709/225 |
| 2005/0114644 A1 | 5/2005 | Chu et al. | |
| 2005/0114854 A1 | 5/2005 | Padisetty et al. | |
| 2005/0177269 A1 | 8/2005 | Funk | |
| 2005/0198624 A1 | 9/2005 | Chipman | |
| 2005/0256964 A1 | 11/2005 | Dube | |
| 2005/0283786 A1 | 12/2005 | Dettinger et al. | |
| 2006/0041644 A1 | 2/2006 | Henseler | |
| 2006/0090154 A1* | 4/2006 | Bustelo | G06F 8/36 717/110 |
| 2006/0122730 A1 | 6/2006 | Niemela et al. | |
| 2006/0259568 A1 | 11/2006 | Lerman et al. | |
| 2006/0271537 A1 | 11/2006 | Chandrasekharan et al. | |
| 2006/0277158 A1 | 12/2006 | Kim | |
| 2007/0136579 A1* | 6/2007 | Levy | H04L 63/102 713/168 |
| 2007/0142929 A1 | 6/2007 | Pereira | |
| 2007/0174037 A1 | 7/2007 | Ling | |
| 2007/0186246 A1 | 8/2007 | Goldhor | |
| 2007/0188248 A1 | 8/2007 | Goldhor | |
| 2008/0021994 A1 | 1/2008 | Grelewicz et al. | |
| 2008/0092073 A1 | 4/2008 | Shih et al. | |
| 2008/0162155 A1* | 7/2008 | Small | G06Q 10/10 705/1.1 |
| 2008/0163269 A1 | 7/2008 | Goto | |
| 2008/0222715 A1 | 9/2008 | Bansal et al. | |
| 2009/0007139 A1* | 1/2009 | Jacobson | G06F 9/45533 719/313 |
| 2009/0095807 A1 | 4/2009 | Dickerson et al. | |
| 2009/0171484 A1 | 7/2009 | Birze et al. | |
| 2009/0198770 A1 | 8/2009 | Jiang | |
| 2009/0249368 A1* | 10/2009 | Needamangala | G06F 11/3644 719/328 |
| 2009/0254878 A1* | 10/2009 | Sage | G06F 9/45516 717/106 |
| 2009/0254880 A1* | 10/2009 | Gryko | G06F 8/33 717/109 |
| 2009/0265719 A1* | 10/2009 | Meijer | G06F 9/45512 719/320 |
| 2009/0307105 A1 | 12/2009 | Lemay et al. | |
| 2010/0010908 A1* | 1/2010 | Pasupulati | G06Q 20/02 705/26.1 |
| 2010/0036665 A1* | 2/2010 | Bess | G06F 8/38 704/251 |
| 2010/0205273 A1 | 8/2010 | Shim | |
| 2010/0271989 A1 | 10/2010 | Chernoguzov et al. | |
| 2010/0299187 A1* | 11/2010 | Duggal | G06Q 10/10 705/14.1 |
| 2011/0154305 A1 | 6/2011 | Leroux et al. | |
| 2011/0179347 A1 | 7/2011 | Proctor et al. | |
| 2011/0238969 A1 | 9/2011 | Warkentin et al. | |
| 2011/0246891 A1 | 10/2011 | Schubert et al. | |
| 2011/0295391 A1 | 12/2011 | Schneider et al. | |
| 2011/0314457 A1* | 12/2011 | Schaude | G06F 9/4498 717/139 |
| 2012/0023487 A1* | 1/2012 | Letca | G06F 11/3466 717/130 |
| 2012/0036493 A1 | 2/2012 | Moosmann et al. | |
| 2012/0174236 A1* | 7/2012 | Goodwin | H04L 63/102 726/27 |
| 2012/0204157 A1* | 8/2012 | Ben-Artzi | G06F 8/51 717/136 |
| 2012/0204161 A1* | 8/2012 | Ben-Artzi | G06F 8/51 717/137 |
| 2012/0209947 A1* | 8/2012 | Glaser | G06F 9/5027 709/217 |
| 2012/0233588 A1 | 9/2012 | Mruthyunjaya et al. | |
| 2012/0233612 A1* | 9/2012 | Beckett | G06F 9/45533 718/1 |
| 2012/0311528 A1 | 12/2012 | DeAnna et al. | |
| 2013/0104100 A1* | 4/2013 | Mueller | G06F 9/44 717/106 |
| 2013/0159981 A1* | 6/2013 | Klemenz | G06F 8/427 717/143 |
| 2013/0201316 A1 | 8/2013 | Binder et al. | |
| 2013/0275560 A1 | 10/2013 | Bestmann et al. | |
| 2013/0275580 A1 | 10/2013 | Bestmann et al. | |
| 2014/0013299 A1* | 1/2014 | Bordeaux | G06F 8/30 717/106 |
| 2014/0040182 A1 | 2/2014 | Gilder et al. | |
| 2014/0101581 A1 | 4/2014 | Lan et al. | |
| 2014/0208296 A1* | 7/2014 | Dang | G06F 8/75 717/123 |
| 2014/0215433 A1 | 7/2014 | Bergamaschi et al. | |
| 2014/0222957 A1* | 8/2014 | Gangadharan | H04L 67/141 709/217 |
| 2014/0258986 A1* | 9/2014 | Wang | G06F 11/3684 717/126 |

(56) References Cited

U.S. PATENT DOCUMENTS

| | | | |
|---|---|---|---|
| 2014/0282431 A1* | 9/2014 | Delio, Jr. | G06F 11/3466 717/130 |
| 2014/0289699 A1* | 9/2014 | Paterson | G06F 11/3664 717/106 |
| 2014/0372963 A1 | 12/2014 | Chandaria et al. | |
| 2014/0372975 A1 | 12/2014 | Chandaria et al. | |
| 2014/0372983 A1 | 12/2014 | Chandaria et al. | |
| 2015/0045960 A1 | 2/2015 | Caron et al. | |
| 2015/0046902 A1 | 2/2015 | Kumar et al. | |
| 2015/0081764 A1* | 3/2015 | Zhao | H04L 67/08 709/203 |
| 2015/0127192 A1 | 5/2015 | Phatak et al. | |
| 2015/0199088 A1 | 7/2015 | Chandaria et al. | |
| 2015/0286362 A1 | 10/2015 | Chandaria et al. | |
| 2015/0331406 A1 | 11/2015 | Wang | |
| 2016/0012026 A1 | 1/2016 | Baikov et al. | |
| 2016/0092064 A1 | 3/2016 | Wu | |
| 2016/0327925 A1 | 11/2016 | Leonelli et al. | |
| 2016/0357526 A1 | 12/2016 | Soffer et al. | |

FOREIGN PATENT DOCUMENTS

| | | |
|---|---|---|
| CN | 101373441 A | 2/2009 |
| CN | 101438299 A | 5/2009 |
| CN | 102177501 A | 9/2011 |
| CN | 102262557 A | 11/2011 |
| CN | 102271153 A | 12/2011 |
| CN | 102479079 A | 5/2012 |
| CN | 102999322 A | 3/2013 |
| EP | 2498178 A1 | 9/2012 |
| EP | 3092561 A1 | 11/2016 |
| JP | 2006216048 A | 8/2006 |
| JP | 2008021095 A | 1/2008 |
| JP | 2010539600 A | 12/2010 |
| JP | 2011150430 A | 8/2011 |
| JP | 2016112651 A | 6/2016 |
| KR | 20080044576 A | 5/2008 |
| WO | WO-2005050503 A1 | 6/2005 |
| WO | WO-2013058788 A1 | 4/2013 |
| WO | WO-2014/041623 A1 | 3/2014 |
| WO | WO-2014204989 A1 | 12/2014 |
| WO | WO-2017/027632 A1 | 2/2017 |

OTHER PUBLICATIONS

Oleksandr Panchenko, Precise and Scalable Querying of Syntactical Source code Patterns Using Sample code Snippets and a Database, 2011, pp. 42-49. https://ieeexplore.ieee.org/stamp/stamp.jsp?tp=&arnumber=5970162 (Year: 2011) (Year: 2011).*

Hossain Shahriar, Injecting Comments to Detect JavaScript Code Injection Attacks, 2011, pp. 104-109. https://ieeexplore.ieee.org/stamp/stamp.jsp?tp=&arnumber=6032221&isnumber=6032200 (Year: 2011).*

Raghunathan Srinivasan, Software based remote attestation for OS kernel and user applications, 2011, pp. 1048-1055. https://ieeexplore.ieee.org/stamp/stamp.jsp?tp=&arnumber=6113258&isnumber=6113084 (Year: 2011).*

International Search Report and Written Opinion dated Nov. 15, 2017 for PCT Application No. PCT/US2017/047944.

Alonso et al., "Computer Networks Exercise 4", ETH, pp. 1-6, 2006.

Krzyzanowski, "Remote Procedure Calls", pp. 27, Oct. 30, 2012.

Bergen et al., "RPC Automation: Making Legacy Code Relevant", pp. 175-180, 2013.

International Search Report and Written Opinion dated Oct. 31, 2014 for PCT Application No. PCT/US2014/042774.

Feipeng Liu, "Android Native development Kit Cookbook", Mar. 1, 2013, XP055326992, ISBN: 978-1-84969-150-5, retrieved on Dec. 7, 2016 from: http://file.allitebooks.com/20150520/Android%20Native%20Development%20Kit%20Cookbook.pdf, pp. 1-331.

International Search Report and written Opinion dated Apr. 13, 2017 for PCT Application No. PCT/US2016/067944, 14 pgs.

International Search Report and written Opinion dated Oct. 4, 2016 for PCT Application No. PCT/US2016/041573.

Singapore Written Opinion dated Jun. 11, 2018 for Application No. 11201708743U.

International Search Report and Written Opinion dated Jun. 15, 2018 for PCT Application No. PCT/US2018/022359.

Japanese Office Action dated Jun. 18, 2018 for Application No. 2016-521515.

Japanese Office Action dated Jun. 18, 2018 for Application No. 2016-521516.

Japanese Office Action dated Jun. 18, 2018 for Application No. 2016-521518.

Chinese Office Action dated Jun. 21, 2018 for Application No. 201480038517.8.

International Search Report and Written Opinion dated Nov. 24, 2017 for PCT Application No. PCT/US2017/047964.

Extended European Search Report dated Oct. 23, 2017 for Application No. 15735508.2.

Haruyoshi Maruyama, "How to Use Device Driver Configurator," Interface, CQ Publishing Co., Ltd., vol. 33, No. 6, Jun. 1, 2007, pp. 57-70.

Kreger, Heather, "Web Services Conceptual Architecture (WSCA 1.0)," Internet Citation, May 2001.

International Search Report and Written Opinion dated Apr. 22, 2019 for PCT Application No. PCT/US18/63704.

PCT International Search Report and Written Opinion on application No. PCT/US2019/055109 dated Jan. 22, 2020.

Cano Julio et al: "Coordination of ECA Rules by Verification and Control", Jun. 3, 2014, International Conference on Computer Analysis of Images and Patterns, CAIP 2017. [Lecture Notes in Computer Science], Springer, Berlin, Heidelberg, pp. 33-48.

Partial Supplementary European Search Report for application No. EP 16880005, date Oct. 21, 2019.

* cited by examiner

METHOD AND APPARATUS FOR CODE VIRTUALIZATION AND REMOTE PROCESS CALL GENERATION

CROSS-REFERENCE TO RELATED APPLICATION

This application is a continuation of co-pending U.S. patent application Ser. No. 14/307,198 filed on Jun. 17, 2014, which claims priority to U.S. Provisional Patent Application No. 61/836,628 filed on Jun. 18, 2013, and U.S. Provisional Patent Application No. 61/842,906 filed on Jul. 3, 2013, which are incorporated by reference herein in their entirety.

BACKGROUND OF THE INVENTION

Field of the Invention

Embodiments of the present invention generally relate to a method and system for process call code-generation.

Description of the Related Art

The growth and integration of computer programming languages has expanded many capabilities of existing languages. Each language offers particular advantages and disadvantages in terms of respective size, execution speed, and various functionality within platforms and devices. As such, some specific languages are made to only work with corresponding devices and users must often be familiar or even be experts with multiple programming languages. In addition, the nature of building modern applications has forced developers to learn multiple languages. Such that writing an application is no longer limited to using one programming language. Integrating and learning multiple languages is a difficult burden, often requiring months or years of training for a programmer/developer to reach a sufficient coding proficiency.

Applications may be composed of various languages and if deployed on servers, requires programmers to learn a front end language, a server language, and a back end language. Front end technologies are also made of several different languages (HTML, Javascript, etc.) to further add to programming complexity.

In addition, more computing occurs over a network and/or the Internet (i.e., "CLOUD computing"), programming with various software development kits (SDKs) and application programming interfaces (APIs) becomes a cumbersome necessity for developers. Emerging services such as social media (TWITTER, FACEBOOK, and the like), data storage (DROPBOX, CLOUD DRIVE, and the like), and financial transactions (PAYPAL, AMAZON, EBAY, and the like) also increase the programming burden on programmers as each service may require its own SDK or API to implement processes offered by the service. For example, TWEETING on TWITTER requires a different code base than for posting a picture on TUMBLR. Using these services also may not be conveniently shown until after applications are deployed on the service, which also may have irreparable results. In other words, programming across multiple platforms, languages, and services remains exceedingly complex to learn in combination with understanding accompanying SDKs and APIs of remote services.

Thus, there is a need in the art for an integrating a local and remote programming environment.

SUMMARY OF THE INVENTION

Embodiments of the present invention generally relate to a method, apparatus, and system for code virtualization and remote process call generation. Specifically, by utilizing a pre-generated code library, virtualized SDK, and snippet generator located on a remote server, a program on a user device leverages multiple services across multiple platforms and programming languages. The user device receives a code snippet and/or virtualized SDK so as to execute at least one remote process call on the remote server, and also in turn deploy the process in the native language of a different remote server substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the described following embodiments, a "process" shall refer to a ready-to-run code base or pre-generated process code that is already stored on an execution computer (e.g., server, personal computer, mobile device, etc.). Each process is uniquely identified by name, process ID, icon, or other identifier to the user of an integrated development environment (IDE). "Execution" shall refer to the launch of a process on a computer (local or remote, or CLOUD based). A "bundle" shall refer to a collection of processes or functions organized by a common attribute (API name, common parameters, SDK, parameter names, and the like).

A "snippet" shall refer to a generated block of customized code to be inserted into a program with a corresponding programming language selected by a user for calling a remote process. Often, the language selected is that of a programming language specified by the user to be implemented in an application and/or IDE on a user device.

Embodiments disclosed herein relate to a code library on a remote server (e.g. "in the CLOUD") wherein the user can remotely select a process and then download a corresponding snippet and/or SDK to access the process from a local application or software program. The snippet allows for a remote process call on the remote server to execute a process on the server or deploy the process on a different remote server or remote. The user device uses a virtualized SDK such that the snippet may communicate with a remote platform on the execution computer. The remote platform includes virtualized components of additional services (e.g., compilers, e-mail, AMAZON, TWITTER, EBAY, DROPBOX, and the like) along with corresponding SDKs and APIs for the services. A computing platform includes a hardware architecture and a software framework (including application frameworks), where the combination allows software to run. Typical platforms include a computer architecture, operating system and Runtime libraries.

A typical SDK includes many tools, libraries, documentation and sample code that would help a programmer to develop an application for a software package, software framework, hardware platform, computer system, video game console, operating system, or similar development platform. An API defines a set of rules that should be followed by the programs to communicate with one another. The rules specify how the routines, data structures, etc. should be defined in order for two applications to communicate with each another. The API is an interface that allows software programs to interact with each other, whereas a SDK is a set of tools that can be used to develop software applications targeting a specific platform. In some instances, an SDK may include an API.

Figure 1:
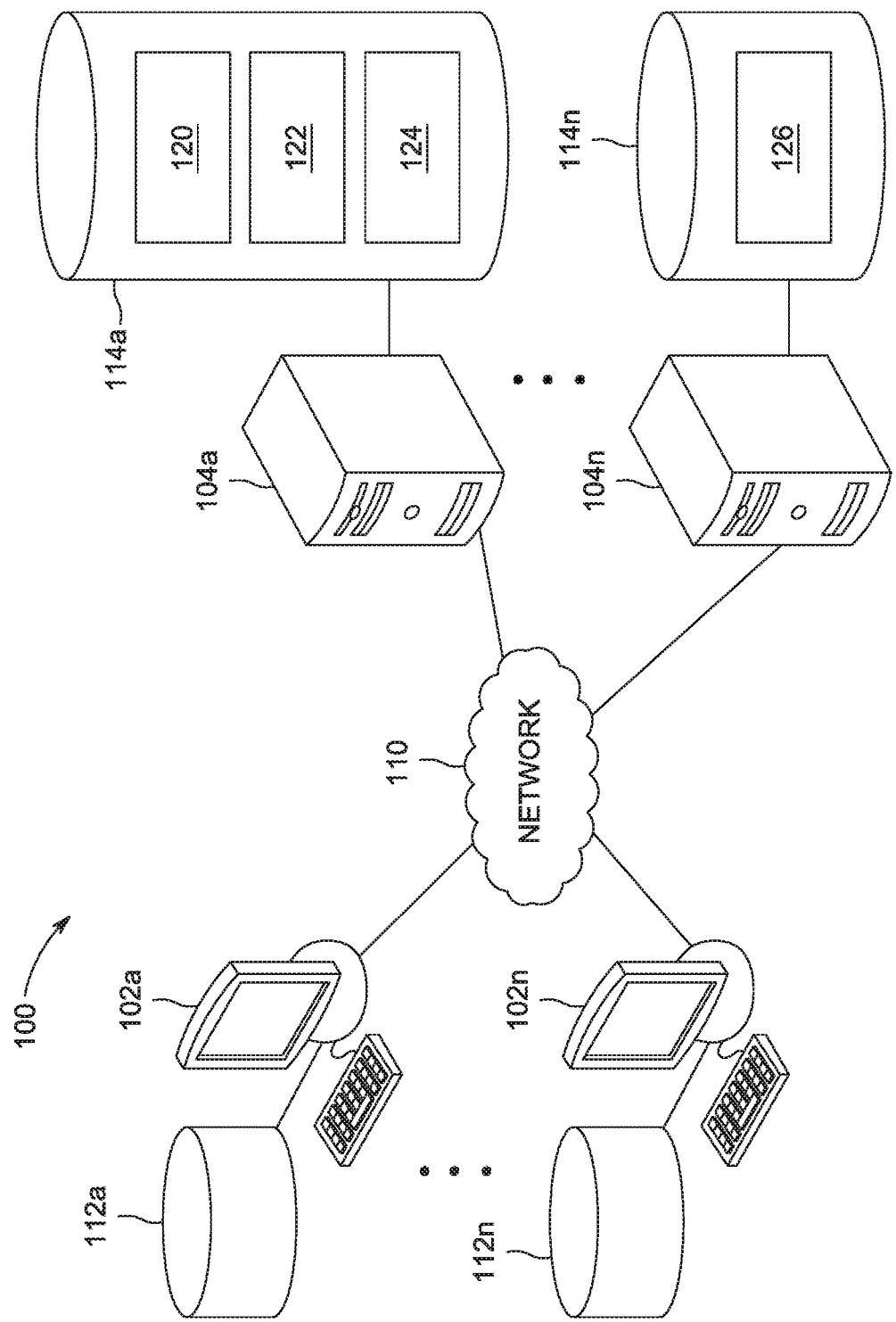
FIG. 1 is an illustration of a code virtualization system in accordance with one or more exemplary embodiments of the present invention.

FIG. 1 is an illustration of a code virtualization system 100 in accordance with one or more embodiments of the present invention. The system 100 comprises at least one user device (102a ... 102n), a network 110, and at least one remote server (104a ... 104n). The at least one user device (102a ... 102n) comprises an electronic device capable of storing and executing a program such as a personal computer, server, virtual server, microcontroller (MCU) and controller, sensor, actuator, edge device connected to a gateway, application-specific integrated circuit (ASIC), micro-processor and processor, cellular phone, smart phone, tablet, laptop, and the like.

Each user device (102a ... 102n) comprises a corresponding memory (112a ... 112n) storing code necessary to connect to and authenticate into the network 110 to connect to at least one remote server (104a ... 104n). In some embodiments, the memory (112a ... 112n) stores an IDE for receiving and deploying snippets from the at least one remote server (104a ... 104n).

The network 110 may comprise at least one of or combination of a wired and/or wireless network such as: a local area network (LAN), wide area network (WAN), wireless local area network WLAN, cellular network, Wi-Fi, Internet, or Intranet networks. The at least one remote server (104a ... 104n) may comprise a remote application server, web server, mail server, host server, database server, storage server, and the like. The at least one remote server (104a ... 104n) comprises memory (114a ... 114n) to store a platform 120 and execute particular process calls such through a SDK generator 122, a snippet generator 124, and an execution engine 126. In some embodiments, the snippet generator 124 may also be stored in the user device (102a ... 102n) for local snippet generation on the user device (102a ... 102n). The memory (114a ... 114n) may also store a user interface module, database of user profiles/accounts, collection of processes, SDKs, and associated parameters to link and execute the processes across other servers 104n (e.g., FACEBOOK, TWITTER, e-mail, SMS, MMS, FTP, and the like) on the network 110.

The execution engine 126 processes calls to routines in the libraries by correlating an identified routine called and running/executing the process using the call parameters. In some embodiments, the execution engine 126 may send output to another process call or the original process call.

In some embodiments, process call parameters are stored either on user device 102a or remote server 104a. In other embodiments, parameters for the process calls are specified directly by the user via pre-generated pre-defined fields presented to the user specified in a graphical user interface. In some embodiments, the graphical user interface is part of an IDE. The IDE utilizing snippets generated by the remote server 104a for integration into a program of a user selected programming language on the user device 102a.

In some embodiments, the IDE also executes remote process calls using the snippets on the server 104a so as to deploy additional processes and access services offered on other servers 104n. The execution is facilitated by a common virtualized SDK and platform that links the remote process calls to a corresponding virtual code provider discussed further below in FIG. 2.

Figure 2:
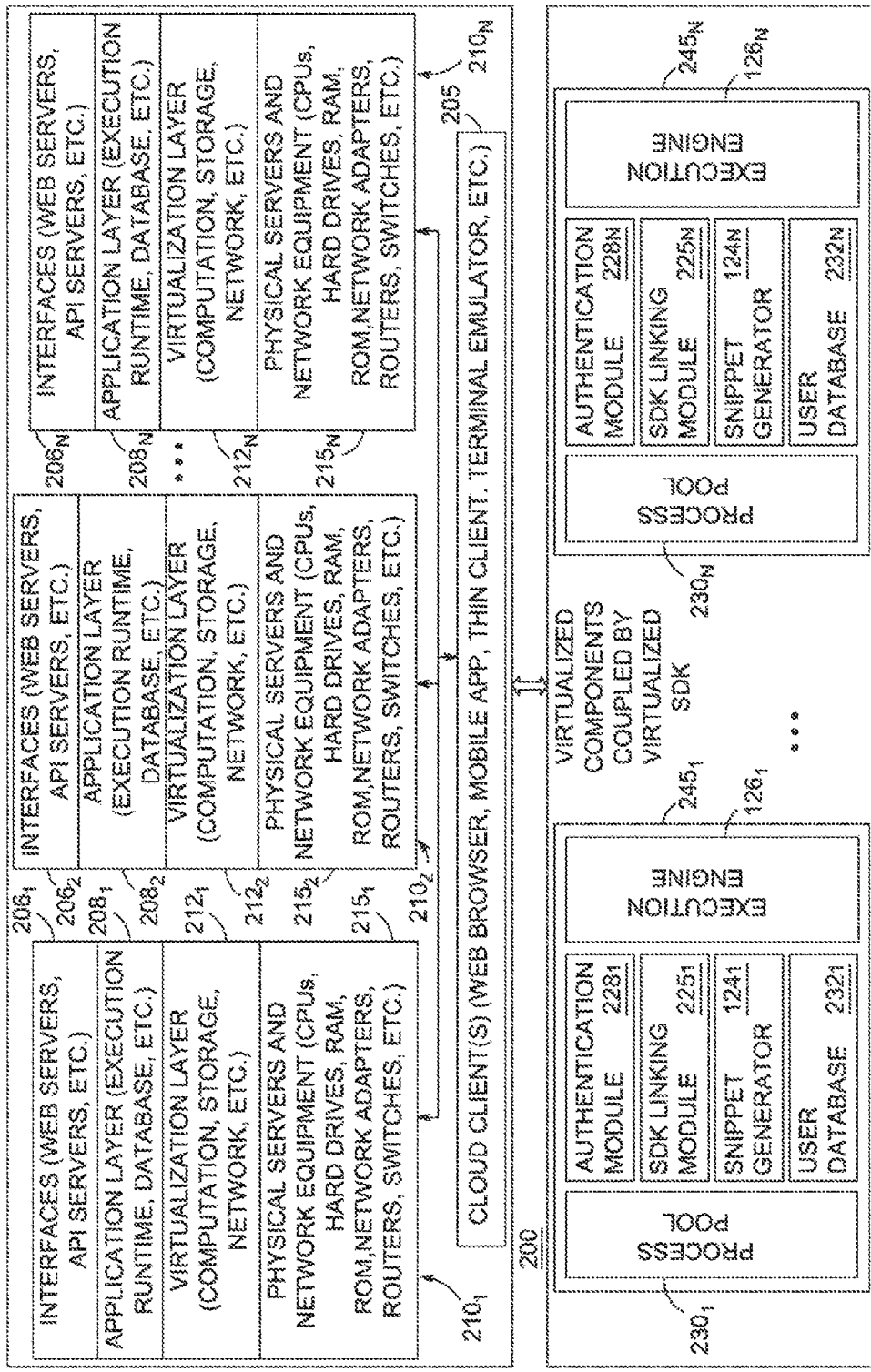
FIG. 2 illustrates a platform to execute classical service components that are interfaced with CLOUD clients using code virtual code providers (VCPs) in accordance with one or more exemplary embodiments of the present invention.

FIG. 2 illustrates a platform 200 to execute classical service components (CSCs) $210_1 \ldots 210_N$ that are interfaced with CLOUD clients 205 using code virtual code providers (VCPs) $245_1 \ldots 245_N$, in accordance with one or more embodiments of the present invention. The platform corresponding to platform 120 that may be stored on the remote server 104a. Hereinafter classical service components $210_1 \ldots 210_N$ are collectively referred to as CSCs 210 and similarly virtual code providers $245_1 \ldots 245_N$ are collectively referred to as VCPs 245. The platform 200 operatively uses a virtualized SDK that links remote process calls from user devices 102 to the CSCs $210_1 \ldots 210_N$ via CLOUD client(s) 205 and the VCPs 245.

The CSC $210_1$ comprises a remote interface $206_1$, an application layer $208_1$, virtualization layer $212_1$, and physical equipment $215_1$. Each CSC 210 represents a specific service offered by the platform 200. For example CSC $210_1$ may be an Internet service and corresponding servers (e.g., FACEBOOK, EBAY, POP3 e-mail, TWITTER, AMAZON, SMS, FTP, HTTP, and the like) and CSC $210_2$ may be a computer offering conventional local data information processing (e.g., image rendering, code compiling, data analytics, data storage, and the like).

Physical equipment $215_1$ or machines (CPUs, memory, network routers, and the like) are virtualized in a virtualization layer $212_1$ to make processing and storage resources available to the application layer $208_1$. Virtualization creates redundancy and increased operating bandwidth in a single computer, and even more in embodiments where multiple machines are virtualized. In such embodiments, the processing workload can also be allocated to various equipment based on priority and independent of the physical location.

An application layer $208_1$ allows execution runtime of programs and functionalities such as database operations (e.g., storing account profiles, warehousing data, and the like) on the virtualized machines. A remote interface layer $206_1$ comprises code to access web servers and utilize APIs. The remote interface $206_1$ communicates with the CLOUD client(s) 205 (e.g., a thin client, web browser, mobile application, terminal emulator program, and the like).

The CLOUD client 205 facilitates communication of data to and from the VCPs 245 with the application layer $208_1$. The CLOUD client 205 simplifies the layer interfaces $206_1$, $208_1$, $212_1$, and $215_1$ by presenting a web browser, terminal emulator or other client interface. Aforementioned embodiments of the present invention may utilize the CLOUD client 205 to facilitate remote process call code generation of snippets on the platform 200 using the virtualized SDK. The virtualized SDK links process calls generated and offered by VCPs 245 to the application layer $208_1$.

The VCPs 245 are enhanced hosted code libraries allowing for virtual sandboxing, normalization, universal language, results parsing, automatic credential verification, simplified oath process, platform maintenance and monitoring. Testing or "sandboxing" the program prior to full deployment of the process and application/program to a remote server has become increasingly important with the addition of multiple remote processes and services contained within a program. The VCPs 245 coordinate snippet process calls using a virtualized SDK that is downloaded to the user device 102a.

From the perspective of the user device 102a, the VCPs 245 allow for a universal programming language offered through the virtualized SDK by templating languages such that only component parameters are needed and inserted into pre-generated code. Process results are thus also capable of being quickly parsed. Access is also streamlined by the platform 200 using pre-authentication and stored centralized management of keys to access remote services. Pre-authentication also produces more secure code by preventing of reverse-engineering of code communicated between the user device 102a and platform 200 that may expose sensitive information. The VCPs 245 also normalize programming by reducing processes to the snippet format. Thus, snippets represent a standardized way of writing code.

For example, 5 lines of code to call any process in the CLOUD is considered as code normalization. The VCPs 245 allow the platform 200 to display real-time monitoring and logging of how the created application is performing (e.g., usage statistics, error handling, and the like). The platform 200 also uses the monitoring to maintain the SDKs of respective VCPs such that APIs in the process pools 230 are continually improving to include new methods, versions and parameters.

The VCP $245_1$ comprises a process pool $230_1$, an authentication module $228_1$, a SDK linking module $225_1$, a snippet generator $124_1$, a user database $232_1$, and an execution engine $126_1$. In some embodiments, a single execution engine 126 may deploy all processes.

For ease of explanation, each of the VCPs 245 corresponds to CSCs 210 in a one-to-one correspondence. However, alternative embodiments may include a different ratio or a single VCP 245 representing the processes of all offered by all CSCs 210. VCPs 245 are stored on remote server(s) 104a in accordance with one or more embodiments of the present invention. The VCPs 245 reduce the remote services offered on the platform 200 of the CSCs 210 to a limited number of executable pre-determined remote processes stored in the process pool 230.

A remote process corresponds to a desired action that may be performed on a given CSC $210_N$. For example, processes for a CSC $210_1$ of FACEBOOK would have a limited process pool $230_1$ of posting a comment, posting a picture, liking a comment or picture, declining a friend request, initiating a friend request, deleting a post and other actions desired by a user. The number of processes in a given process pool 230 is thus limited to the actions available by a service associated with the CSC $210_1$. Continuing the example, there would not be a process in the platform 200 to place a review of a product on FACEBOOK. However, such a process would be processed by the platform 200 as available on AMAZON.

The process pool $230_1$ this stores all pre-generated code associated with each process offered by the remote platform 200 and corresponding CSCs 210. In some embodiments, the pre-generated code is in the native language necessary for the remote application layer $208_1$ to recognize the pre-generated code processes. In other embodiments, the programming language may be native to a user device 102a for an IDE.

The snippet generator $124_1$ generates a snippet by inserting parameters entered by a user as well as process names to create a snippet with a corresponding SDK such that the snippet may call the associated process from the process pool $230_1$. The snippet parameters may be entered using a GUI comprising predetermined fields associated a selected remote process. The snippet parameters may also be retrieved as previously stored in the user database $232_1$ The user database $232_1$ comprising user profiles, histories, and stored credentials for various service bundles. In other embodiments, the snippet may be generated locally on the user device 102a.

In alternative embodiments, the snippet generator $124_1$ generates a snippet when called using an API call such as through the simple object access protocol (SOAP), representational state transfer (REST) model, or cURL.

The generated snippet is in a programming language specified by the user or required by the platform 200. For example, a user may have a pre-existing program on the user device 102a written in JAVA. An associated snippet would need to have a process call to the virtualized SDK and platform 200 in the JAVA syntax and corresponding libraries on the user device 102a in order to directly insert the snippet into the pre-existing program.

The authentication module $228_1$ receives credentials from a user or uses previously entered and stored credentials from a user to access a CSC $210_1$ associated with the VCP $245_1$. The authentication module $228_1$ may authenticate also into the platform 200. The user database $232_1$ is the account database for a given service of a CSC $210_1$. In other embodiments, the user database $232_1$ is a collection of user accounts for authentication into the platform 200. Subsequently, the platform 200 coordinates the authentication across multiple VCPs 245 and associated CSCs 210. For example, a user logging into the platform 200 of a remote server (e.g., TEMBOO servers) similarly will authenticate into an e-mail server and EBAY account using pre-defined credentials stored on the remote server 104a previously submitted by the user.

The SDK linking module $225_1$ is comprised of code to allow the authentication module $228_1$ to interface with the network 110 as well as communicating with the user device 102a and APIs to form various bundles of remote processes. The SDK linking module $225_1$ also coordinates the communication with multiple SDKs and APIs across multiple VCPs 245 for cross-platform and cross-service interactions. For example, the SDK linking module $225_1$ coordinates process pools 230 and corresponding SDKs (e.g., EBAY SDK, TWITTER SDK, SMS SDK, and the like) to form a combined single process call in the virtualized SDK. Continuing the example, by linking processes from respective process pools, a single process call with the virtualized SDK may substantially simultaneously TWEET and SMS text a winning auction on EBAY price matched to a product sold on AMAZON.

Lastly, the execution engine $126_1$ executes the selected process from the process pool $230_1$, deploys the process onto another remote server $104n$ or corresponding CSC $210_1$ to execute the remote process. In some embodiments, the execution engine $126_1$ may also return results to the user database or the user device $102a$. In further embodiments, the execution engine $126_1$ also executes the remote process from the process pool $230_1$ when the created snippet is used to call the process when imbedded into the local code base or pre-existing program on the user device $102a$. Further still are embodiments requiring the execution engine $126_1$ to operates with the SDK linking module $225_1$ to use different SDKS to coordinate the communication among multiple VCPs 245 such as to link and perform several remote process calls.

Figure 3:
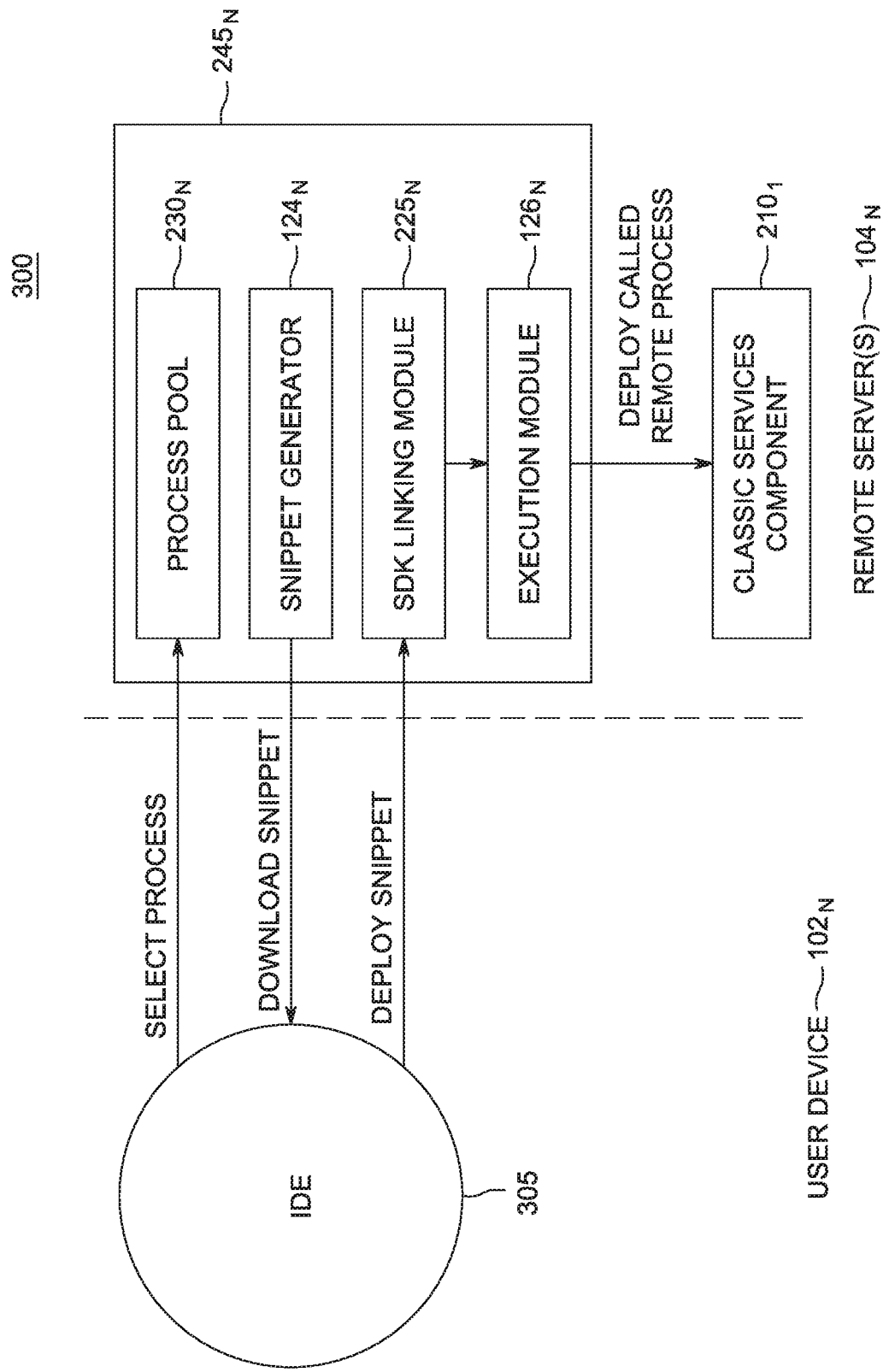
FIG. 3 is an illustration of an overview method using the virtual code providers disclosed in FIG. 2 interfacing with an integrated development environment in accordance with one or more exemplary embodiments of the present invention.

FIG. 3 is an illustration of an overview method 300 using the virtual code providers 245 disclosed in FIG. 2 interfacing with an integrated development environment (IDE) 305 in accordance with one or more embodiments of the present invention. The method 300 utilizes an IDE 305 on a user device $102n$, and VCPs 245 stored on remote servers $104n$. The method 300 downloads language snippets in a selected programming language native to the IDE 305 to call remote processes in various programming languages and platforms of corresponding CSCs 210 necessary to execute the remote processes. In the described embodiment, a single exemplary snippet corresponding to a single VCP $245_N$ and CSC $210_N$ is shown however other embodiments include multiple snippets and corresponding VCPs 245 and CSCs 210.

The IDE 305 coordinates a local code base with a remote code base and allows programs or applications to be written locally but yet, include remote process calls using a virtualized SDK. In some embodiments, the virtualized SDK may be downloaded and stored in the user device $102n$.

A user device $102a$ is displayed available bundles of processes offered the VCP $245_N$ and a remote process is selected. In some embodiments, the user of the IDE 305 may have an existing program written in the specific programming language. In such an embodiment, the user also selects the same programming language for the snippet as the existing program.

The snippet is then downloaded to the IDE 305. In some embodiments, the snippet is generated by the snippet generator $124_N$. In other embodiments, the snippet may be previously generated and recalled with authentication into a user account located in the VCP $245_N$. In some embodiments, the snippet is edited by the user in the IDE 305 to include parameters for the process. Alternatively, the parameters may be submitted by the user when selecting the process from the process pool $230_N$ such that the snippet is downloaded with the parameters already inserted into the snippet.

The IDE 305 then deploys the snippet to the SDK linking module $225_N$. In some embodiments, the snippet is deployed using a virtualized SDK to associate the remote process call of the snippet to the corresponding VCP 245. In other embodiments, the deployed snippet is directly deployed to the corresponding VCP 245.

The SDK linking module $225_N$ retrieves pre-generated code associated with the selected process and associated SDK of a CSC $210_N$. For example, for a CSC $210_N$ corresponding to the AMAZON servers and the process is to purchase an item, the SDK linking module $225_N$ retrieves pre-generated code from the process pool $230_N$ in a native language used to access and execute a purchase on AMAZON servers using parameters submitted from the user parsed from the snippet. Continuing the example, parsed parameters for the AMAZON purchase would include the product name and serial number, a name of the user, shipping address, and credit card information. The pre-generated code inserted with parameters is sent to the execution engine $126_N$ that subsequently deploys the remote process on the corresponding CSC $210_1$.

Figure 4:
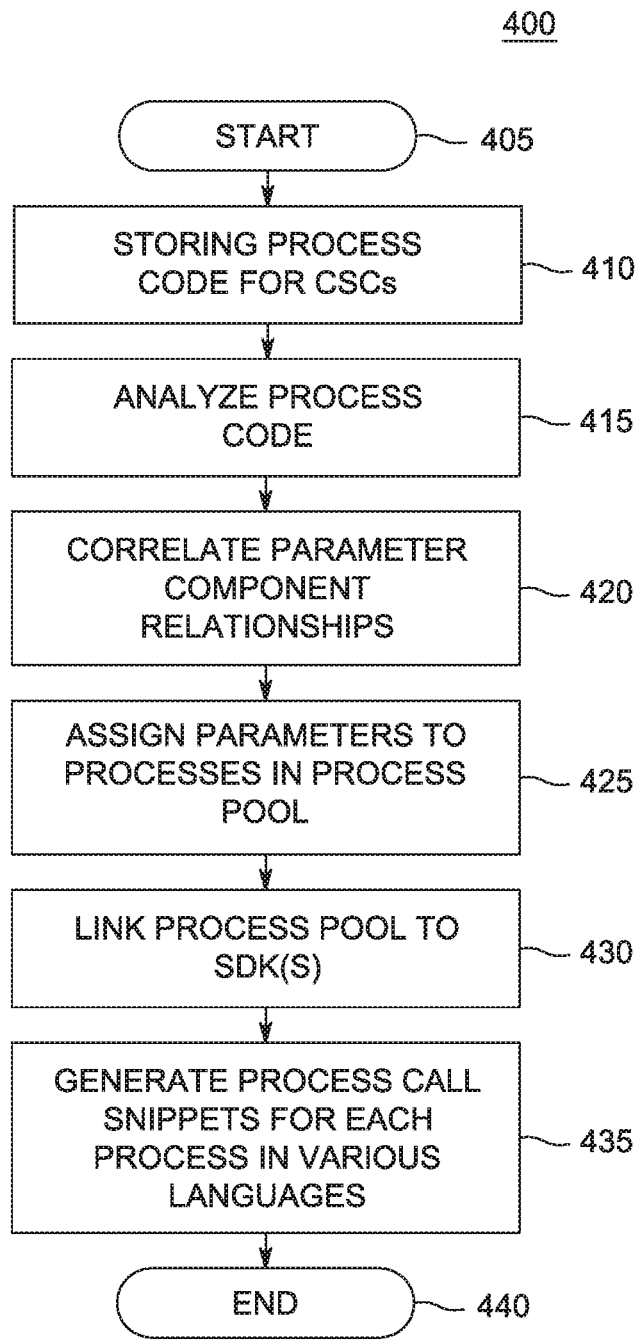
FIG. 4 is a flow diagram for a method of creating process call snippets in accordance with one or more exemplary embodiments of the present invention.

FIG. 4 is a flow diagram for a method of creating process call snippets in accordance with one or more embodiments of the present invention. The method may be implemented by system 100 in FIG. 1 and the platform 200 discussed in FIG. 2 above. The method 400 generates remote process calls.

The method 400 begins at step 405 and continues to step 410 wherein processes code associated with services offered by CSCs 210 are stored into memory (e.g., process pools 230). The process code may be in a native language that is unique to a $CSC_N$. In some embodiments, the VCPs 245 generate the process code or alternatively, the process code may be pre-generated and prepared for insertion of parameter data.

Next at step 415, the process code is analyzed for attributes. Attributes include parameters (e.g., variables), programming language type, as well as necessary SDKs or APIs for interfacing and executing the process code on the CSCs 210. Attributes also include distinguishing parameters based on respective relationships between the parameters and the function of the parameter for a given process. For example, a send e-mail process requires parameters such as an originating e-mail address, destination e-mail address, subject, current time, time to send, and message body.

Next at step 420 the parameters are correlated based on relative relationships to offered processes and role in performing a process on the CSCs 210. In the example, each of the parameters has a specific respective function in the process and relation to the other parameters. A destination e-mail address is allotted to a portion of the process code requiring a destination e-mail that is related with a corresponding message subject and body with the originating e-mail address as an author of the e-mail. The time to send parameter includes a value as to when the e-mail is to be sent, and is accordingly correlated to the function of time for execution within the send e-mail process. In alternative embodiments, the analyzed process code is native to the SDKs and APIs of respective CSCs 210 (e.g., AMAZON, TWITTER, and the like). In some embodiments, relationship information also includes the source of the raw parameter components. Parameter data may be manually entered by the user, automatically entered (e.g., stored authentication keys), conditionally based on the result of another process, or related to a parameter of another process.

At step 425, the parameters are assigned to at least one process in the process pools 230. Continuing the previous example, the originating email address may be assigned to the process for sending an email as well as a login credential to a POP3 server necessary for another process to authenticate into an e-mail server.

At step 430, the processes in the process pools 320 are linked to a virtualized SDK. The virtualized SDK may be downloaded to a user device to call the processes in the process pools 230. In some embodiments, calling a process includes receiving parameter data from a snippet that is inserted into recalled stored process code and executing the process code with inserted parameters on corresponding CSCs 210 using APIs and SDKs for the CSCs 210 linked to the virtualized SDK. In such embodiments, the requisite APIs and SDKs are also linked to the associated process code in the process pools 320.

At step 435, the method 400 generates process call snippets for each process of the process pools 230 in multiple programming languages using pre-existing language templates for a selected language. The method 400 then ends at step 440.

Figure 5:
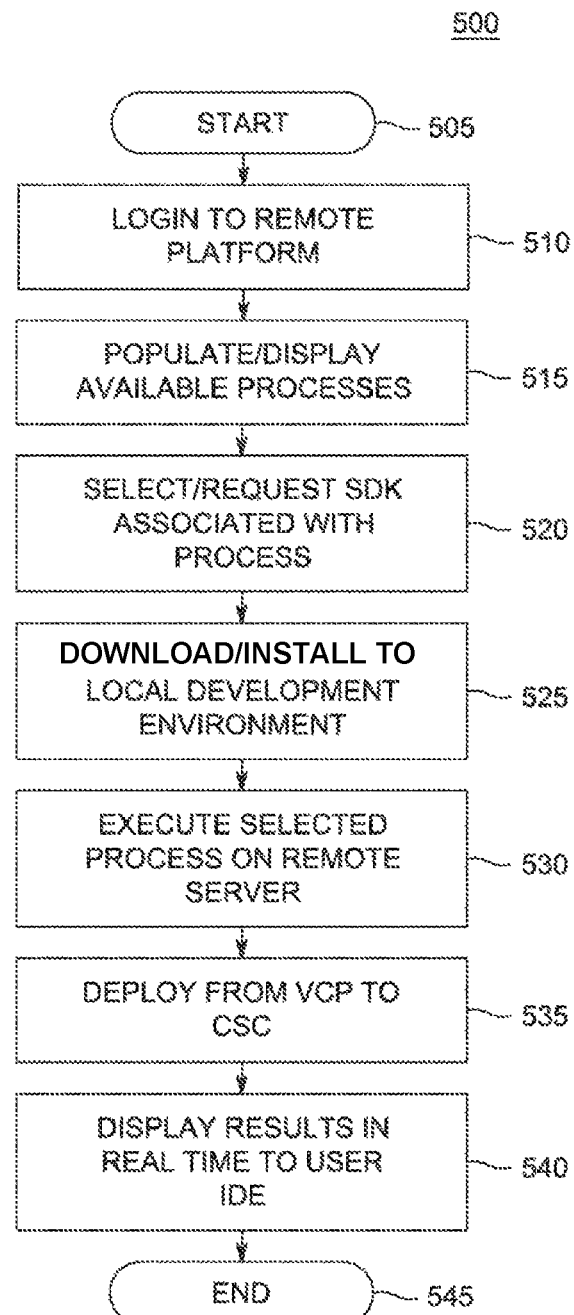
FIG. 5 is a flow diagram of a method for expanding a local development environment with additional remote processes in accordance with one or more exemplary embodiments of the present invention.

FIG. 5 is a flow diagram of a method 500 for expanding a local development environment with additional remote processes in accordance with one or more embodiments of the present invention. Through a virtualized SDK, the method 500 allows the code base on the user device 102a to be small and only include SDKs that are being implemented by the user. The method 500 includes authenticating into a remote programming platform 200 that processes the remote process calls of the virtualized SDK.

The method 500 begins at step 505 and continues to step 510 wherein a user device 102a logs into the remote platform 200. The account of the user is authenticated and associated with previously stored keys and credentials for various remote services of CSCs 210 (e.g., data storage, e-mail, websites, social media, brokerages, banking, and the like). The authentication modules 228 coordinate with one another to authenticate into associated various CSCs 210 of the VCPs 245. In some embodiments, the platform 200 includes a centralized user account with a profile history of commonly used routines, processes, SDKs, and APIs. The profile history is recorded and updated for both the platform 200 and in the user databases 232 corresponding to associated VCPs 245 and CSCs 210.

The method 500 continues to step 515 wherein remote processes are populated and/or displayed to the user device 102a. In embodiments wherein the user device 102a has a display, the available processes will be shown via the IDE 305 to the user. Remote processes of process pools 230 may be displayed as bundles of processes corresponding to actions offered for a specific CSC 210. For example, a CSC 210 corresponding to TWITTER would include a FOLLOW bundle for all sub-actions (e.g., FOLLOW, stop FOLLOW, FOLLOW status, and the like) using the FOLLOWING function and a TWEET bundle for sub-functions using TWEETs.

The method 500 continues to step 520 wherein a virtualized SDK associated with the selected remote process is requested from the remote server 104a. The virtualized SDK may include all remote process calls or customized to include code to handle calls to selected processes. In some embodiments, the virtualized SDK is specific to the programming language on the user device 102a. The virtualized SDK provides a code snippet with all the necessary helpers/tools to call the remote process selected on the corresponding VCP 245.

In embodiments wherein no display is available, the method 500 may automate downloading the corresponding SDK of a selected process. The virtualized SDK allows remote process calls via the SDK linking modules 225 that link a process from the process pool to a corresponding SDK and API associated with at least one remote service of the CSCs 210. For example, where the CSC 210 is GOOGLE, the virtualized SDK includes linking to the GOOGLE SDK and API that has commands for a running a GOOGLE search and returning results from the search to a particular computer for a specific query.

At step 525 to download and install the associated virtualized SDK into the local IDE 305 such that the IDE 305 will have access to the remote process and integrate the virtualized SDK with existing local code base on the user device 102a. The virtualized SDK is a language-specific local code library that the developer needs to have installed in her/his local code base (and then in the deployed code for production).

Next at step 530, the downloaded virtualized SDK is used to allow a local program (e.g., created on the user device 102a) to call and execute a corresponding remote process on the server 104a using parameters entered by the user in the IDE 305. Parameters may be entered via pre-defined fields presented to the user via a graphical user interface. The pre-defined fields limit and simplify the information necessary to create the remote call snippet. The data of the parameters will then be transmitted to the remote server 104a and inserted into pre-generated code in the process pools 230 comprising the remote processes.

As will be further discussed below in FIG. 6, the virtualized SDK also provides support for generated snippets. The snippets generated in a selected programming language that is native to the operating and/or programming environment (e.g., IDE 305) of the user device 102.

At step 535, the remote server 104a deploys through the VCP 245 and execution engine 125 the correlated remote process to the CSC 210 associated with the remote process and VCP 245.

At step 540 real-time results of the executed process are also displayed from the remote server 104a in the IDE 305. Thus, a successful FACEBOOK post may return a message to the remote server 104a that processes a response to notify the IDE 305. In some embodiments, the results are returned directly from the CSCs 210 associated with the process call. For example, the results from a FACEBOOK post may be returned directly to the IDE 305. The method 500 then ends at step 545.

Figure 6:
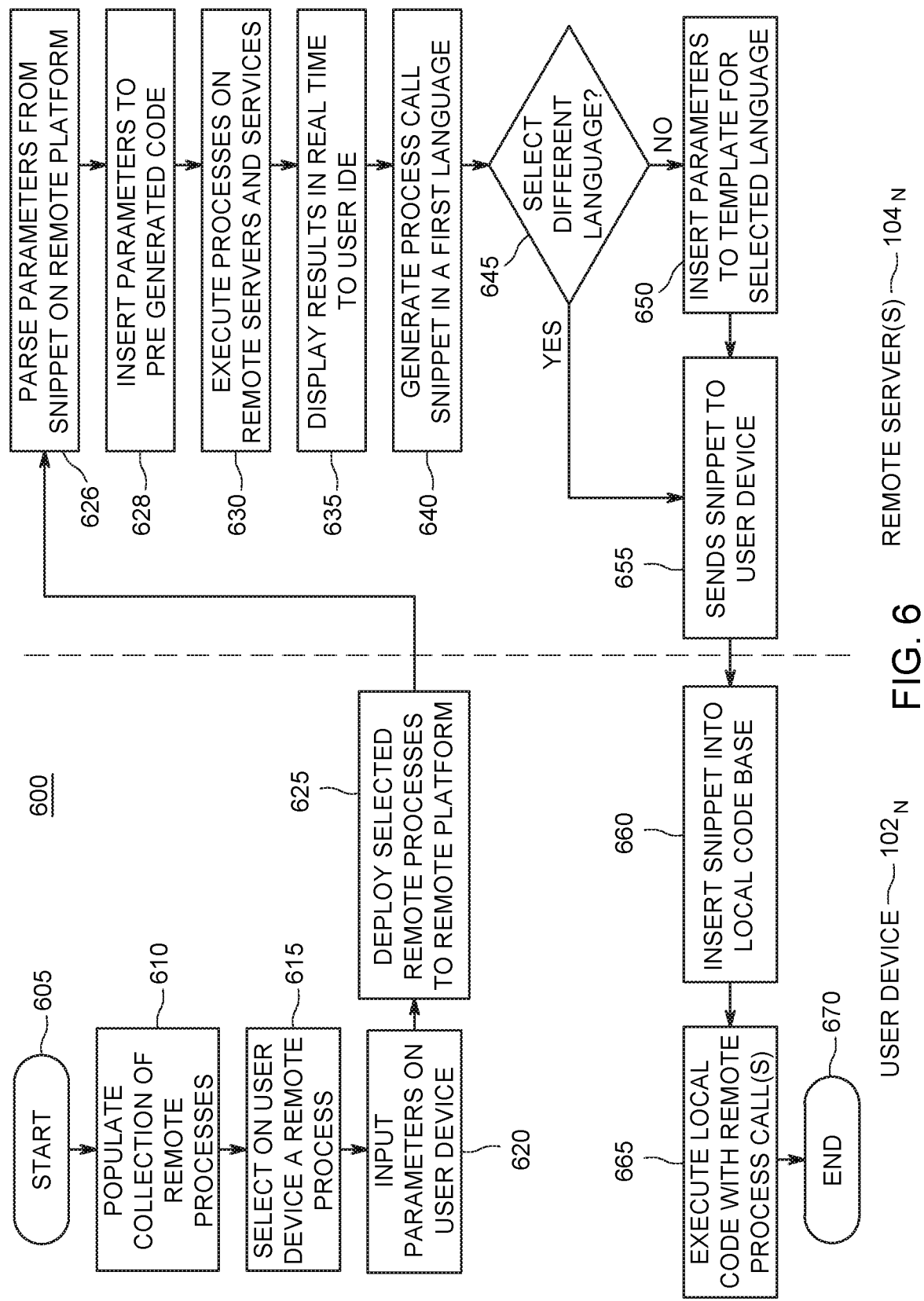
FIG. 6 is a flow diagram of a method for a virtualized process call code-generator for various programming languages in accordance with one or more exemplary embodiments of the present invention.

FIG. 6 is a flow diagram of a method 600 for a virtualized process call code-generator for various programming languages in accordance with one or more embodiments of the present invention. The method 600 applies the virtualized SDK and allows for conversion between various programming languages by generating a snippet tailored for the user device 102a and/or IDE 305 to call remote processes on CSCs 210. In some embodiments, the method 600 is a continuation of method 500 in calling a remote process with a virtualized SDK.

The method 600 begins at step 605 and continues to step 610 wherein the collection of remote processes are populated for the user device 102a. In some embodiments the user device 102a must login to the remote platform 200 such that the user account has access to the remote processes. The login process described in further detail above with respect to FIG. 5.

Next at step 615, at least one remote process is selected. In some embodiments, the remote process is selected through a graphical user interface (GUI) on the user device 102a. In other embodiments, the remote process is specified by calling to the remote process through a function in a virtualized SDK downloaded to the user device 102a.

At step 620, parameters are input from the user for the selected process in the user device 102a. The parameters may include authentication keys for services, timing information, payload data, file extensions, and other information necessary to successfully execute a remote process. The parameters are inserted into a snippet generated in association with a remote process. In some embodiments, the parameters are input by the user via the local IDE 305 and in further embodiments, some parameter entries may be completed remotely using stored credentials or data on the remote server 104*a*. The IDE 305 is in communication with the platform 200 stored on remote server 104*a*.

At step 625 a program (e.g., IDE 305) on the user device 102*a* locally triggers deployment of the selected remote process with associated process parameters to the remote platform 200. The deployment utilizes the snippets and virtualized SDK to call the appropriate VCPs 245 and process pools 230 on the remote platform 200.

At step 626, the parameters are parsed from the snippets. Parsing includes directing the parameters to the VCPs for the selected process as linked through the virtualized SDK.

At step 628, the parsed parameters are inserted into pre-generated code. In some embodiments, the pre-generated code in the native language of the CSCs 210 and in process pools 230.

At step 630, the process is executed on an actual remote environment such as CSCs 210. For example, a purchase using AMAZON servers or sending a POP3 email, and the like. However, alternative embodiments may execute the selected process in a test environment for testing or "sandboxing" the program prior to full deployment of the process and program to a remote server. Sandboxing becomes increasingly important with the addition of multiple remote processes and services within a program.

Next at step 635, results are displayed in real-time to the user IDE. In some embodiments, results of process calls deployed on CSCs 210 also provide monitoring and maintenance using the remote platform 200 to VCPs 245. The snippets of the application are processed such that native code(s) are executed on remote servers (e.g., CSCs 210) using parameter data from the snippet. In such an embodiment, the platform 200 then monitors and logs the application to returns statistics such as usage and error data to the IDE 305 and update APIs and SDKs in the VCPs 245. The updates are then integrated into the corresponding pre-generated code in the process pools 235 to reduce subsequent runtime errors.

At step 640 the code snippet for triggering the selected remote process call is generated in a first default programming language by the corresponding VCPs 245. In some embodiments, the code snippet may be generated simultaneous to the deployment of the selected remote processes on the CSCs 210. Further still are embodiments wherein the code snippet may be generated without deployment or execution of the process.

In some embodiments a code snippet may call/access remote services also on the network 110. For example, a program may be written in ECLIPSE used to simultaneously TWEET a user specified message and check-in on FOURSQUARE using pre-authenticated keys/credentials of the associated user account. To access such services, the snippet generator generates a code snippet to be inserted into ECLIPSE to call the remote TWITTER and FOURSQUARE services and execute the aforementioned processes. As will be described further below, in some embodiments the parameters from the IDE can then be extracted to build the snippet format via the snippet generator 124.

In some embodiments, the code snippet may also include execution timing information. The code snippet is formed from a predefined template for a particular programming language on the user device 102*a* that communicates process calls to the remote platform 200 using the installed virtualized SDK.

At step 645, the method 600 determines whether the user has selected a different programming language in the IDE 305. In some embodiments, the method 600 may automatically detect the desired programming language by comparing existing programming code input by the user as well as via stored user profile preferences or histories by the platform 200. If the method 600 determines no other language is selected or the default language is the correct language the snippet sent to the user device 102*a* at step 655. However, if the method 600 determines another language is selected or detected, the snippet is regenerated or reformatted using a template for the corresponding selected language at step 650. In some embodiments, the templates supplement user entered parameters with previously stored parameters on the user device 102*a* or the server 104*a* such as variables, access keys to remote APIs, tokens, credentials, and the like.

From step 650, the method also continues to step 655 and sends the new snippet to the user device 102*a* and/or IDE 305. Next, at step 660, the snippet is inserted into the local code base such that a local program written by the user may call remote processes on the server 104*a* over the network 110 in addition to code that is to be run locally on the machine (e.g., solely on the user device 102*a*). In some embodiments, the local code base may also access other networked machines. In further embodiments, the local code base can be on the developer workstation or already deployed on servers (directly or through a code management systems such as GITHUB).

At step 665, the local code and remote process calls may be executed within the user IDE or in the native development environment chosen by the user. The method 600 then ends at step 670.

Figure 7:
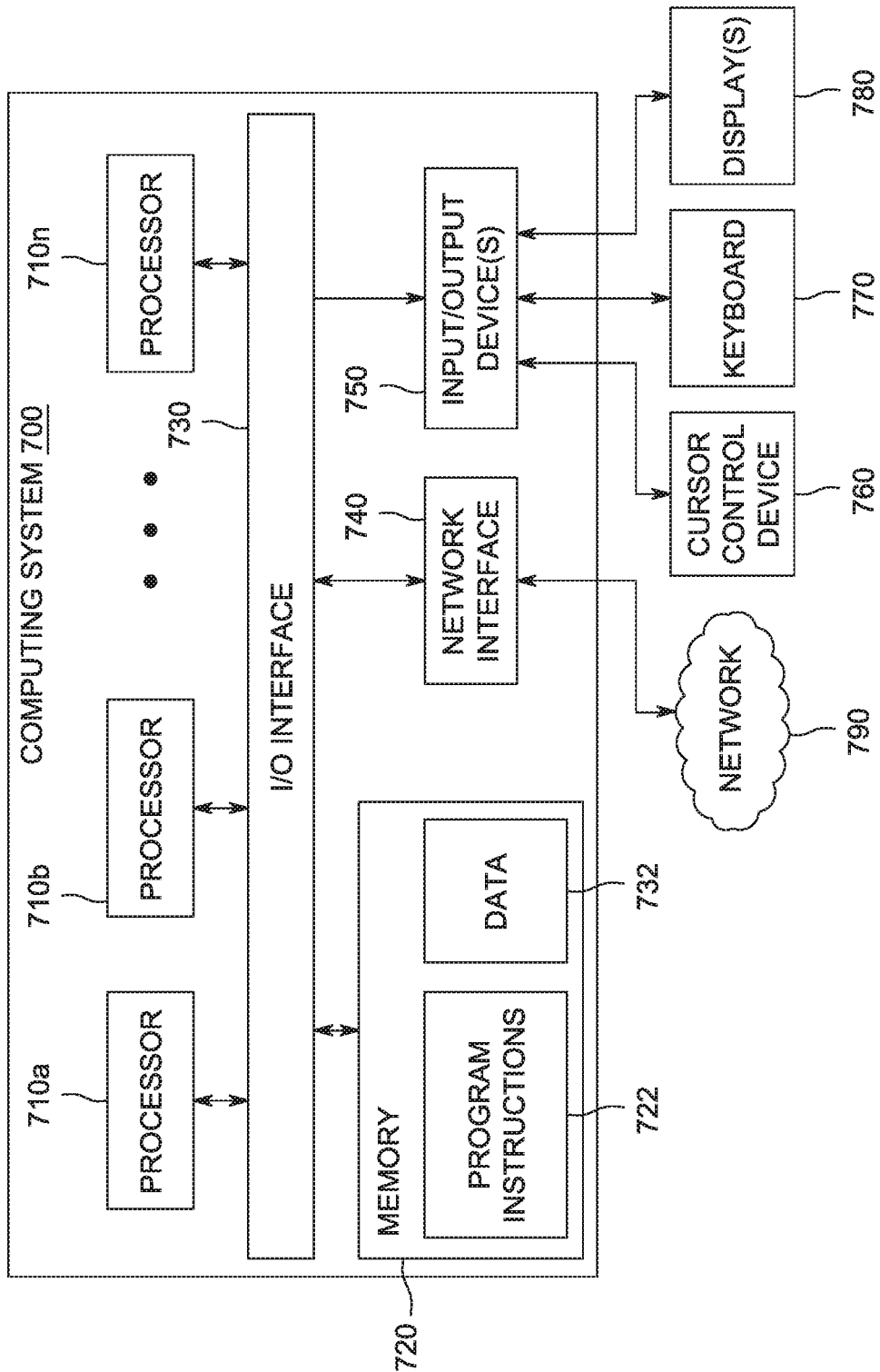
FIG. 7 is a block diagram of modules within an exemplary computing server in accordance with one or more exemplary embodiments of the present invention.

FIG. 7 is a simplified block diagram of modules within an exemplary computing server in accordance with one or more embodiments of the present invention. The computer system 700 comprises substantially similar structure comprising servers or electronic devices in the aforementioned embodiments.

Various embodiments of methods and system for snippet generation and remote process calls, as described herein, may be executed on one or more computer systems, which may interact with various other devices. One such computer system is computer system 700 illustrated by FIG. 7, which may in various embodiments implement any of the elements or functionality illustrated in FIGS. 1-6. In various embodiments, computer system 700 may be configured to implement methods described above. The computer system 700 may be used to implement any other system, device, element, functionality or method of the above-described embodiments. In the illustrated embodiments, computer system 700 may be configured to implement methods 400, 500, and 600 as processor-executable executable program instructions 722 (e.g., program instructions executable by processor(s) 710) in various embodiments.

In the illustrated embodiment, computer system 700 includes one or more processors 710*a*-710*n* coupled to a system memory 720 via an input/output (I/O) interface 730. Computer system 700 further includes a network interface 740 coupled to I/O interface 730, and one or more input/output devices 760, such as cursor control device 760, keyboard 770, and display(s) 780. In some embodiments, the keyboard 770 may be a touchscreen input device.

In various embodiments, any of the components may be utilized by the system to route and execute remote process calls as described above. In various embodiments, a user interface may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, computer system 700 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 700 may be a uniprocessor system including one processor 710, or a multiprocessor system including several processors 710 (e.g., two, four, eight, or another suitable number). The uniprocessor system including a one processor 710 may split functionality of the single processor to appear as multiple processors for processing and executing simultaneous data of a program. Processors 710 may be any suitable processor capable of executing instructions. For example, in various embodiments, processors 610 may be general-purpose or embedded processors implementing any of a variety of instruction set architectures (ISAs). In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 790), such as one or more external systems or between nodes of computer system 700. In various embodiments, network 790 may include one or more networks including but not limited to Local Area Networks (LANs) (e.g., an Ethernet or corporate network), Wide Area Networks (WANs) (e.g., the Internet), wireless data networks, cellular networks, Wi-Fi, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, touchscreens, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the methods described above, such as the methods illustrated by the flowchart of FIGS. 3-6. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions of various embodiments, including computers, network devices, Internet appliances, smartphones, tablets, PDAs, wireless phones, pagers, and the like. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

An exemplary snippet generated for insertion into a JAVA program calls the TEMBOO virtualized SDK includes:

```
package TembooDemoECOs;
import com.temboo.Library.NYTimes.ArticleSearch.QueryArticles;
import com.temboo.Library.NYTimes.ArticleSearch.QueryArticles.QueryArticlesInputSet;
import com.temboo.Library.NYTimes.ArticleSearch.QueryArticles.QueryArticlesResultSet;
import com.temboo.core.TembooException;
import com.temboo.core.TembooSession;
public class TembooDemoECOs {
    /**
     * @param args
     * @throws TembooException
     */
    public static void main(String[ ] args) throws TembooException {
        // Instantiate a Temboo session
        TembooSession session = new TembooSession("demo", "myFirstApp", "6d975bf6-e761-47c7-8");
        // Instantiate the Choreo, using a previously instantiated TembooSession object
        QueryArticles queryArticlesChoreo = new QueryArticles(session);
            // Get an InputSet object for the choreo
            QueryArticlesInputSet queryArticlesInputs = queryArticlesChoreo.newInputSet( );
            // Set credential to use for execution
            queryArticlesInputs.setCredential("NYTimesCred");
            // Set inputs
            queryArticlesInputs.set_Query("obama");
            // Execute Choreo
            QueryArticlesResultSetqueryArticlesResults=queryArticlesChoreo.execute(queryArticlesInputs);
            // Print results using ECOs
            for (int i = 0; i < queryArticlesResults.getArticles( ).length; i++)
{System.out.println(queryArticlesResults.getArticles( )[i].getTitle( ) + " :: " + queryArticlesResults.getArticles( )[i].getByLine( ));
            }
        }
    }
```

In the above example, the snippet comprises five lines of code capable of being inserted into any Java program. Beginning with code for "Instantiate a Temboo session" and ending with code for "Execute Choreo". These lines of code are capable of being edited in a local IDE as text and edited in the future so as the user knows the names of choreos he or she would like to call. The line "package TembooDemoECOs;" calls the virtualized SDK by doing an import of a specific class: QueryArticles. The above example is possible with installation this exemplary SDK that comprises the code for QueryArticles:

```
public class QueryArticles extends Choreography {
    /**   Create a new instance of the QueryArticles Choreo. A TembooSession object, containing a valid
        set of Temboo credentials, must be supplied.
    */
    public QueryArticles(TembooSession session) {
        super(session,
TembooPath.pathFromStringNoException("/Library/NYTimes/ArticleSearch/QueryArticles"));
    }
    /**   Obtain an InputSet object, used to define inputs for an execution
of this Choreo.
        @return QueryArticlesInputSet
    */
    public QueryArticlesInputSet newInputSet( ) {
        return new QueryArticlesInputSet( );
    }
    /**
    * Execute the Choreo using the specified InputSet as parameters, wait for
the Choreo to complete
    * and return a ResultSet containing the execution results.
    * @param choreoInputs
    * @return
    * @throws TembooException
    */
    @Override
    public QueryArticlesResultSet execute(InputSet choreoInputs) throws
TembooException {
        JSONObject result = super.executeWithResults(choreoInputs);
        return new QueryArticlesResultSet(result);
    }
    /**          An InputSet with methods appropriate for specifying the
```

```
inputs to the QueryArticles Choreo. The InputSet object is used to specify input
parameters when executing this choreo.
     */
        public static class QueryArticlesInputSet extends InputSet {
            /**   Set the value of the APIKey input for this Choreo.
              @param String - (required, string) The API Key provided by NY
Times.
              */
              public void set_APIKey(String value) {
                  this.setInput("API Key", value);
              }
      /**     Set the value of the BeginDate input for this Choreo.
           @param String - (optional, date) Sets the starting point (which is
inclusive) of the range of publication dates to return. Must be used with EndDate.
Date should be formatted like YYYYMMDD.
           */
              public void set_BeginDate(String value) {
                  this.setInput("BeginDate", value);
              }
      /**     Set the value of the EndDate input for this Choreo.
           @param String - (optional, date) Sets the end point (which is
inclusive) of the range of publication dates to return. Must be used with BeginDate.
Date should be formatted like YYYYMMDD.
           */
              public void set_EndDate(String value) {
                  this.setInput("EndDate", value);
              }
      /**     Set the value of the Facets input for this Choreo.
           @param String - (optional, string) A comma-delimited list of up
to 5 facets. This indicates the sets of facet values to include in the response. See
Choreo documentation for more information about accepted values for this input.
           */
              public void set_Facets(String value) {
                  this.setInput("Facets", value);
              }
              /**     Set the value of the Fields input for this Choreo.
           @param String - (optional, string) A comma-delimited list of
fields to return. These fields are returned by default: body, byline, date, title, and url.
           */
              public void set_Fields(String value) {
                  this.setInput("Fields", value);
              }
              /**     Set the value of the Offset input for this Choreo.
           @param Integer - (optional, integer) This corresponds to which
set of 10 results is returned. Used to page through results. Set to 0 to return records
0-9, set to 1 to return records 10-19, etc.
           */
              public void set_Offset(Integer value) {
                  this.setInput("Offset", value);
              }
              /**     Set the value of the Offset input for this Choreo as
a String.
           @param String - (optional, integer) This corresponds to which
set of 10 results is returned. Used to page through results. Set to 0 to return records
0-9, set to 1 to return records 10-19, etc.
           */
              public void set_Offset(String value) {
                  this.setInput("Offset", value);
              }
              /**     Set the value of the Query input for this Choreo.
           @param String - (required, string) Search keywords (optionally
applied to specific fields) and/or facets. See Choreo documentation for syntax
examples.
           */
              public void set_Query(String value) {
                  this.setInput("Query", value);
              }
              /**     Set the value of the Rank input for this Choreo.
           @param String - (optional, string) Sets the order of the results.
Accepted values are: newest (the defaults), oldest, or closest.
           */
              public void set_Rank(String value) {
                  this.setInput("Rank", value);
              }
          }
          /**     A ResultSet with methods tailored to the values returned
by the QueryArticles Choreo.
              The ResultSet object is used to retrieve the results of a Choreo
execution.
```

```
*/
    public static class QueryArticlesResultSet extends ResultSet {
        public    QueryArticlesResultSet(JSONObject    doc)    throws
TembooException {
            super(doc);
        }
        /**     Retrieve the value for the "Response" output from
this Choreo execution
            @return String - (json) The response from the NY Times API.
        */
        public String get_Response( ) {
            return this.getResult("Response");
        }
        /** The value of offset corresponds to a set of 10 results (i.e.
offset=0 for results 0-9, offset=1 for results 10-19, etc)
        */
        public String getOffset( ) {
            return (String)
((JSONObject)getJSONFromString(this.getResult("Response"))).opt("offset");
        }
        /** Get an article matching the search criteria
        */
        public NYTimesArticle[ ] getArticles( ) {
            JSONArray list = (JSONArray)
((JSONObject)getJSONFromString(this.getResult("Response"))).opt("results");
            NYTimesArticle[ ] resultArray = new NYTimesArticle[(list != null) ?
list.length( ) : 0];
            if(list != null) {
                for(int i=0; i<list.length( ); i++) {
                    try {
                        resultArray[i] = new NYTimesArticle(list.get(i));
                    } catch (JSONException e) { }
                }
            }
            return resultArray;
        }
        /** Contains the search tokens provided for the query
        */
        public String[ ] getTokens( ) {
            JSONArray list = (JSONArray)
((JSONObject)getJSONFromString(this.getResult("Response"))).opt("tokens");
            String[ ] resultArray = new String[(list != null) ? list.length( ) : 0];
            if(list != null) {
                for(int i=0; i<list.length( ); i++) {
                    try {
                        resultArray[i] = (String) list.get(i);
                    } catch (JSONException e) { }
                }
            }
            return resultArray;
        }
        /** The total number of articles for this search
        */
        public Number getTotal( ) {
            return (Number)
((JSONObject)getJSONFromString(this.getResult("Response"))).opt("total");
        }
    }
}
```

By installing the above exemplary virtualized SDK, the snippet may now execute calls to remote processes. The code snippet links to the virtualized SDK code to call the actual process on the remote server 104a through the associated VCPs 245. In some embodiments, the SDK comprises insuring the input parameters are in the proper format and then calling the corresponding remote process. In the above example a "choreo" is a graphical representation of a remote process on the user device 102a and/or local IDE 305.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner.

Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for code virtualization comprising:
   receiving, at a virtual code provider (VCP) from a user device remote to the VCP, a user selection of a process for execution on the VCP, the process configured to execute at least one remote service provided by a classical services component (CSC), which is remote to the VCP and the user device;
   in response to the user selection of the process for execution on the VCP, generating, at the VCP, a code snippet for execution on the user device, the code snippet comprising a call from the user device to the VCP for executing the selected process,
   downloading the generated code snippet to the user device;
   executing the generated code snippet on the user device to place the call from the user device to the VCP to execute the selected process at the VCP;
   wherein the generated code snippet from the VCP is inserted into a local code base on the user device, and
   wherein the code snippet and the local code base are of a same programming language.

2. The method of claim 1, wherein the code snippet is executed on the user device with a software development kit (SDK) installed on the user device.

3. The method of claim 1, further comprising receiving the code snippet with parameter data and extracting parameter values of the parameter data to execute commands corresponding to remote services on a plurality of CSCs, wherein generating the code snippet further comprises coordinating a plurality of SDKs for the plurality of CSCs.

4. The method of claim 1, further comprising authenticating into the VCP.

5. The method of claim 1, further comprising displaying real-time results of deploying the code snippet to call the process from the user device.

6. The method of claim 1, wherein receiving the user selection of the process further comprises receiving a selection of a programming language for generating the code snippet.

7. The method of claim 1, wherein the code snippet further comprises a parameter from a pre-defined field to call the process.

8. The method of claim 1, wherein the code snippet further comprises a field for receiving a parameter related to the process.

9. An apparatus for code virtualization comprising:
   at least one processor; and
   at least one storage device storing processor executable instructions which, when executed by the at least one processor, performs a method comprising:
   receiving, at a virtual code provider (VCP) from a user device remote to the VCP, a user selection of a process for execution on the VCP, the process configured to execute at least one remote service provided by a classical services component (CSC), remote to the VCP and the user device,
   in response to the user selection of the process for execution on the VCP, generating, at the VCP, a code snippet for execution on the user device, the code snippet comprising a call from the user device to the VCP for executing the selected process,
   downloading the generated code snippet to the user device,
   executing the generated code snippet on the user device to place the call from the user device to the VCP to execute the selected process at the VCP,
   wherein the generated code snippet from the VCP is inserted into a local code base on the user device, and
   wherein the code snippet and the local code base are of a same programming language.

10. The apparatus of claim 9, wherein the code snippet is executed on the user device with a software development kit (SDK) installed on the user device.

11. The apparatus of claim 9, wherein the method further comprises receiving the code snippet with parameter data and extracting parameter values of the parameter data to execute commands corresponding to remote services on a plurality of CSCs, wherein generating the code snippet further comprises coordinating a plurality of SDKs for the plurality of CSCs.

12. The apparatus of claim 9, wherein the method further comprises authenticating into the VCP.

13. The apparatus of claim 9, wherein the method further comprises displaying real-time results of deploying the code snippet to call the process from the user device.

14. The apparatus of claim 9, wherein receiving the user selection of the process further comprises receiving a selection of a programming language for generating the code snippet.

15. The apparatus of claim 9, wherein the code snippet further comprises a parameter from a pre-defined field to call the process.

16. The apparatus of claim 9, wherein the code snippet further comprises a field for receiving a parameter related to the process.

* * * * *